US006798941B2

(12) United States Patent
Smith et al.

(10) Patent No.: US 6,798,941 B2
(45) Date of Patent: Sep. 28, 2004

(54) VARIABLE TRANSMISSION MULTI-CHANNEL OPTICAL SWITCH

(75) Inventors: David A. Smith, Atlanta, GA (US); John E. Golub, Atlanta, GA (US); Fariborz Farhan, Alpharetta, GA (US)

(73) Assignee: Movaz Networks, Inc., Norcross, GA (US)

( * ) Notice: Subject to any disclaimer, the term of this patent is extended or adjusted under 35 U.S.C. 154(b) by 78 days.

(21) Appl. No.: 09/957,312

(22) Filed: Sep. 20, 2001

(65) Prior Publication Data

US 2002/0071627 A1 Jun. 13, 2002

Related U.S. Application Data

(60) Provisional application No. 60/234,683, filed on Sep. 22, 2000, and provisional application No. 60/267,285, filed on Feb. 7, 2001.

(51) Int. Cl.[7] .............................. G02B 6/26; G02B 6/42
(52) U.S. Cl. ........................................ 385/18; 385/19
(58) Field of Search .............................. 385/18, 19, 15, 385/33; 398/156

(56) References Cited

U.S. PATENT DOCUMENTS

| | | | | |
|---|---|---|---|---|
| 4,696,062 A | * | 9/1987 | LaBudde ..................... 398/156 |
| 4,911,526 A | | 3/1990 | Hsu et al. ................. 350/96.24 |
| 5,414,540 A | | 5/1995 | Patel et al. ..................... 359/39 |
| 5,621,829 A | | 4/1997 | Ford ............................. 385/22 |
| 5,745,271 A | | 4/1998 | Ford et al. ................... 359/130 |
| 5,771,320 A | | 6/1998 | Stone ........................... 385/16 |
| 5,796,479 A | | 8/1998 | Derickson et al. .......... 356/326 |
| 5,828,800 A | | 10/1998 | Henry et al. .................. 385/20 |
| 5,915,063 A | | 6/1999 | Colbourne et al. ......... 385/140 |
| 5,960,133 A | | 9/1999 | Tomilinson .................. 385/18 |
| 6,097,859 A | | 8/2000 | Solgaard et al. ............... 385/17 |
| 6,101,299 A | | 8/2000 | Laor ............................. 385/16 |
| 6,111,686 A | * | 8/2000 | Toyohara ................ 359/337.13 |
| 6,204,946 B1 | | 3/2001 | Aksyuk et al. ............. 359/131 |
| 6,263,123 B1 | | 7/2001 | Bishop et al. ................. 385/15 |

FOREIGN PATENT DOCUMENTS

| | | |
|---|---|---|
| EP | 0 984 311 | 3/2000 |
| EP | 0 729 044 | 1/2003 |
| JP | 55-159402 | 12/1980 |
| WO | W/O 02/25358 | 3/2000 |
| WO | WO 00/20899 | 4/2000 |

OTHER PUBLICATIONS

Lin et al., "Micro–electro–mechanical systems (MEMS) for WDM optical–crossconnect networks", *Military Communication Conference Proceedings, 1999. MILCOM 1999. IEEE Atlantic City, NJ. USA 31, IEEE, US*, Oct. 31, 1999, 954–957 pp.

G. Jeong et al., "Comparison of Wavelength–interchanging and wavelength–selective cross–connects in multiwavelength all–optical networks", *IEEP*, 1996, 156–163 pp.

* cited by examiner

*Primary Examiner*—Chandrika Prasad
(74) *Attorney, Agent, or Firm*—Charles S. Guenzer

(57) ABSTRACT

A multi-wavelength or white-light optical switch including an array of mirrors tiltable about two axes, both to control the switching and to provide variable power transmission through the switch, both for optimization and for power equalization between wavelength channels in a multi-wavelength signal. The output power of a channel is monitored, thereby allowing feedback adjustment of the transmitted power. The mirrors are preferably formed in a micro electromechanics system array to be tiltable in orthogonal directions and having electrostatically controlled tilting by two pairs of electrodes beneath the mirrors. Input power of the separate channels may also be monitored.

37 Claims, 11 Drawing Sheets

VARIABLE TRANSMISSION MULTI-CHANNEL OPTICAL SWITCH

RELATED APPLICATIONS

This application claims benefit of U.S. Provisional Applications Nos. 60/234,683, filed Sep. 22, 2000, and 60/267,285, filed Feb. 7, 2001.

BACKGROUND OF THE INVENTION

1. Field of the Invention

The invention relates generally to optical switches. In particular, the invention relates to optical switches used in multi-channel optical communications networks and having controlled transmissivity for different channels.

2. Background Art

Modern communications networks are increasingly based on silica optical fiber, which offers very wide bandwidth including several transmission bands usable for communications. In a conventional point-to-point optical communications link, at the transmitter, an electrical data signal is used to modulate the output of a semiconductor laser emitting, for example, in the 1550 nm band, and the modulated optical signal is impressed on one end of the silica optical fiber. Other transmission bands at 850 nm and 1310 nm are also available. On very long links, the optical signal may be amplified along the route by one or more optically pumped erbium-doped fiber amplifiers (EDFAs) or other optical amplifiers. At the receiver, the optical signal from the fiber is detected, for example, by an optical p-i-n diode detector outputting an electrical signal in correspondence to the modulating electrical signal. The transmission bandwidth of such systems is typically limited by the speed of the electronics and opto-electronics included in the transmitter and receiver. Speeds of 10 gigabits per second (Gbs) are available in fielded systems, and 40 Gbs systems are reaching production. Further increases in the speed of the electronics will be difficult. These speeds do not match the bandwidth inherent in the fiber, which is well in excess of one terabit per second. Furthermore, such fast optical transmitters and receivers are expensive and may require special environmental controls.

Transmission capacity of fiber systems can be greatly increased by wavelength division multiplexing (WDM) in which the optical signal is generated in a transmitter including multiple semiconductor lasers emitting at different respective wavelengths within the transmission band. The 1550 nm transmission band has a bandwidth of about 35 nm, determined by the available amplification band of an EDFA. Other amplifier types and amplification bands are being commercialized so that the available WDM spectrum is growing each year. In a WDM system, each laser is modulated by a different electrical data signal, and the different laser outputs are optically combined (multiplexed) into a multi-wavelength optical signal which is impressed on the optical fiber and which together can be amplified by an EDFA without the need to demultiplex the optical signal. At the receiver, an optical demultiplexer, such as one based on a diffraction grating, an arrayed waveguide grating, or a thin-film filter array, spatially separates the different wavelength components, which are separately detected and output as respective electrical data signals. For an N wavelength WDM wavelength grid, the fiber capacity is increased by a factor of N using electronics of the same speed. Dense WDM (DWDM) systems are being designed in which the WDM comb includes 40, 80 or more wavelengths with wavelength spacings of under 1 nm. Current designs have wavelength spacings of between 0.4 and 0.8 nm, that is, frequency spacings of 50 to 100 GHz. Spectral packing schemes allow for higher or lower spacings, dictated by economics, bandwidth, and other factors.

Point-to-point WDM transmission systems as described above enable very high transmission capacity in networks having simple connectivity. However, a modem communications network 10, such as that illustrated in FIG. 1, tends to be more complex and requires that the WDM concept be expanded to cover not only transport but also switching in a complex communication network. This network 10 has multiple switching nodes 12 switching signals between multiple terminals 14 at the edges of the network 10. Fiber optic links 16 interconnect the switching nodes 12 and terminals 14. The switching nodes 12 should be capable of switching single-wavelength WDM channels in different directions with the directions being changeable over some time period. The network diagram of FIG. 1 is highly conceptual but emphasizes the switching requirement of the illustrated complexly connected network. Such a WDM network 10 achieves high capacity through multi-wavelength channel transport along complexly fiber-interconnected routes. To achieve a flexible dynamic interconnection within the network 10, it is desirable that the fiber infrastructure be wired differently for different wavelengths. As a result, the optical switches 12 should not only be dynamically reconfigurable between multiple ports but also the switch state should be able to be wired simultaneously, yet independently in each wavelength channel. That is, the cross-connects 12 should be wavelength selective. Channel paths 20 are illustrated in FIG. 1 in which three wavelength channels at wavelengths $\lambda_1$, $\lambda_2$, $\lambda_3$ can enter a switching node 12 on a single fiber 16 but be switched at its outputs to three different fibers 16. Also note that this architecture allows the reuse of wavelengths between different pairs of terminals 14, for example, the wavelength $\lambda_1$ as illustrated. Frequency reuse further increases the traffic capacity of the network 10. Such switching requirements apply as well to a more regularly configured ring network having switching nodes distributed around a fiber ring with a terminal associated with each node.

The practice in the recent past has been to form each link 16 in the network 10 as a separate point-to-point WDM system so that each switching node 12 includes an optical receiver and an optical transmitter for each wavelength channel. The electrical data signals derived from the optical receiver are spatially switched by conventional electronic switches and then converted back to optical form for transmission on the next link. However, a point-to-point design does not integrate well into a complex network such as in FIG. 1. The required number of optical receivers and transmitters become very expensive. Also, such a system requires the electronics and opto-electronics at each switching node to be operating at the highest data rate supported by the network. Such a system is unduly costly when some end-to-end links require only modest data rates, and the system is difficult to upgrade since all the nodes must be upgraded at the same time.

For these and other reasons, there is much interest in all-optical communication networks in which each switching node demultiplexes the multi-wavelength WDM signal from an input fiber into its wavelength components, spatially switches the separate single-wavelength beams in different directions, and multiplexes the switched optical signals for retransmission on one or more output fibers. Thus, a wavelength-routing node will generally switch WDM channels in an all-optical manner unless there is a specific need to electrically regenerate a specific subset of channels, for example, to remove accumulated optical noise through electrical regeneration or to perform wavelength conversion. Indeed, the goal is to reduce the number of conversions from optical to electrical and back to optical at each intervening node in a fiber optic end-to-end link.

An all-optical wavelength-selective switching node 12 may be implemented by a wavelength cross connect (WXC) such as a 3×3 WXC 22, represented in the simple schematic diagram of FIG. 2, coupling three input ports 24 to three output ports 26, each port being typically equated with a transmission fiber in the network. The WXC 22 has the capability of switching any wavelength channel on any input port 24 to the corresponding wavelength channel on any output port 26. The design is not limited to a 3×3 cross connect with three input and three output ports and may be generalized to a W×W cross connect with W input ports and W output ports, where W is greater than 1. Systems under development have values of W up to 12, and further replication is possible. An unequal number of input and output ports is possible but will not be further discussed here.

Although other designs are possible, the WXC 22 is typically accomplished, as illustrated in the schematic diagram of FIG. 3, by splitting the WDM channels into their wavelength components and switching those wavelength components by optical elements generally insensitive to the wavelength values, often referred to as white-light elements. The multi-wavelength signal on each optical input port 24 enters a respective one of 3 (more generally W) optical demultiplexers 28 which separate the multi-wavelength signal into its N wavelength channels, here illustrated as N=4, and outputs single-wavelength switching beams 30. The single-wavelength switching beams 30 of the same nominal wavelength enter a respective one of N white-light cross connects $32_1$ to $32_N$, which can switch any input switching beam 30 to any of its output switching beams 34 without regards to wavelength except that the switching beams 30, 34 in any plane have the same wavelength or color. W optical multiplexers 36 each receive N single-wavelength output switching beams of N different wavelengths and combines them into a multi-wavelength signal impressed on one of the W output ports 26. By such an arrangement, the N wavelength channels on each of the W input ports 24 are simultaneously and independently routed to selected ones of the W output ports 26. The wavelength multiplexers and demultiplexers may be accomplished in a number of ways typically including dispersive elements such as Bragg gratings, thin-film interference filter arrays, and arrayed waveguide gratings (AWGs) that spatially separate wavelength components.

There are a number of ways of achieving the wavelength routing functionality represented by the wavelength cross connect 22. The illustrated structure of FIG. 3 represents a replicative approach using N distinct white-light cross connects $32_1$, to $32_N$. A more integrated design, schematically illustrated in FIG. 4, uses the same input and output ports, multiplexers 36, and demultiplexers 28, but uses fibers 42, 44 on the switch side of the demultiplexers 28 and multiplexers 36 to route the single-wavelength signals to a large white-light optical cross connect 46 having WN inputs and WN outputs. The optical cross connect 46 needs to be configured so that it connects inputs to outputs of the same nominal wavelength. Any cross-wavelength connection results in loss of that signal at the output multiplexers 36 and perhaps corruption of another signal.

Solgaard et al. in U.S. Pat. No. 6,097,859 (hereinafter referred to as Solgaard) disclose a multi-wavelength cross connect switch based on an array of micro electromechanical system (MEMS) mirrors. In this device, multi-wavelength WDM signals are received on typically two or more input ports. An input lens systems collimates these beams and directs them to a diffraction grating that reflects different wavelength channels at different angles. The resulting two-dimensional array of beams, in which input beams are separated in one dimension and the wavelength channels are separated in the other dimension, is imaged onto an array of electronically actuated MEMS micro-mirrors. Each beam is reflected by its micro-mirror at a selected angle that depends upon the voltage applied to the mirror actuator. Because switching is performed between corresponding wavelength channels of different fibers, in the simplest design the mirrors need to tilt only in a single dimension.

A more integrated design following the Solgaard design includes the wavelength multiplexing and MEMS switching in a single unit. A 2-input, 2-output, 7-wavelength switching system 50 is schematically illustrated in FIG. 5. Two input fiber waveguides 52, 54 and two output fiber waveguides 56, 58 are aligned linearly parallel to each other to couple into two free-space input beams 60, 62 and two free-space output beams 64, 66. A lens 68 collimates the input beams 60, 62 to both strike a diffraction grating 70.

Considering the first input beam 60, the diffraction grating 70 angularly disperses it into a fan-shaped collection 72 of beams angularly separated according to wavelength, as is well known in the art and taught by Solgaard. That is, the grating 70 acts as a wavelength-dispersive element. The wavelengths of the signals on the one input fiber 52, as well as on all the other fibers 54, 56, 58 correspond to the WDM wavelengths of one of the standardized grids, for example, the ITU grid, and each optical carrier signal of the different wavelengths on the separate fibers is modulated according to its own data signal. Each of the beams in the collection 72 of beams corresponds to one of the wavelength channels of the ITU grid. A lens 74 focuses these beams toward a first row 75 of tiltable input mirrors 76, typically formed as a two-dimensional array in the plane of a MEMS structure. The mirrors 76 of the first row 75 are associated with the wavelength channels of the first input fiber 52 while those in second row 77 are associated with the second input fiber 54. The mirrors 76 are also arranged in a second dimension in which each column 78 is associated with one of the wavelengths $\lambda_1$ through $\lambda_7$ for the illustrated 7-wavelength system. The mirrors 76 described to this point are input mirrors. Similarly arranged output mirrors 80 in rows 82, 84 are output mirrors. The mirrors 76, 80 are tiltable about respective axes lying generally horizontally in the illustration so that the input mirrors 76 direct each input beam 60, 62 beam toward a folding mirror 86. Depending upon the tilt angle of the respective input mirror 76, the folding mirror 84 reflects that beam to the output mirror 80 in a selected one of the output rows 82, 84. The two illustrated connections show coupling to output mirrors 80 located alternatively in the third and fourth rows 82, 84. The output mirrors of the third row 82 are associated with respective wavelength channels on the first output fiber 56 while those of the fourth row 84 are associated with the wavelength channels on the second output fiber 58. The optics are arranged and controlled such that an optical signal from an input mirror 76 is reflected only to one of the output mirrors 80 in the same column 78, that is, associated with the same WDM wavelength. The input and output mirrors 76, 80 typically have the same construction and differ only by their placement in a two-dimensional array in a single MEMS structure. Practically speaking, in this configuration, the designation of input and output mirrors is arbitraxy and the input and output rows may be interleaved.

In some applications, it is possible to dispense with the folding mirror 86 and to use only a single set of micromirrors to directly reflect a wavelength-separated input beam back to a selected output fiber although this configuration presents problems with uniformity of coupling.

Each output mirror 80 is also tiltable in correspondence to the tilt angle of the input mirror 76 to which it is coupled through the folding mirror 86 so that the same optics 68, 70, 74 used to focus and demultiplex the beams from the input fibers 52, 54 are also used to multiplex the wavelength-separated output beams onto the two output fibers 56, 58. That is, the diffraction grating 70 acts as both a demultiplexer on the input and a multiplexer on the output.

By means of the illustrated optics and MEMS micromirror array, a wavelength channel on either of the input fibers 52, 54 can be switched to the same wavelength channel on either of the output fibers 56, 58. It is of course understood that the described structure may be generalized to more input and output fibers and to more WDM wavelengths.

Another system 90, as illustrated in the schematic diagram of FIG. 6, provides much of the functionality of the system 50 of FIG. 5. Input fibers 92 are arranged in a first linear array 94 and output fibers 96 are arranged in a second linear array 96. The system includes a first two-dimensional array 100 of input mirrors 102 and a second two-dimensional array 106 of output mirrors 108. In both arrays 100, 106, the mirrors 102, 108 are arranged in row directions according to fiber and in column directions according to wavelength. The beams are directly coupled between the input and output mirrors 102, 108 without the use of a folding mirror. However, such a coupling mirror may be advantageously applied between the two mirror arrays 100, 106 and eliminate the need for separate gratings and further allow the input and output fibers 92–98 to be placed in a single linear array. Advantageously, separate demultiplexing and multiplexing gratings 110, 112 are provided on the input and output sides respectively, and birefringent wave plates are inserted so as to substantially eliminate polarization dependence within the switch, as is well understood by those in art.

A large white-light cross connect may have a structure similar to that illustrated in FIG. 6 but without the diffraction grating. A white-light system 120 illustrated in the schematic illustration of FIG. 7 includes a substantial number of input fibers 122 bundled together in a two-dimensional array 124 and preferably a like number of output fibers 126 bundled together in another two-dimensional array 128. One of the input fibers 122 concentrates its beam at one of the input mirrors 102 of the input mirror array 100. Similarly, the output mirror array 106 has its output mirrors 108 near the focus of the output fibers 126. An optional mirror 130 couples the input and output mirrors 102, 104, Each input mirror 102 is tiltable about two axes to allow it to direct its input beams to any ones of the output mirrors 106. Each output mirror 106 is similarly tilted in a complementary fashion to direct the beam towards the output fiber 126 associated with that output mirror 108.

Another unillustrated white-light system resembles the folded white-light system 120 of FIG. 7 but with the input and output fibers arranged in a same one- or two-dimensional array and with the mirror arrays 100, 106 integrated into a single one- or two-dimensional array.

A complex WDM or white-light network is subject to many problems. The different optical signals which are propagating on a particular link or being optically processed may have originated from different sources across the network. In a WDM system, the WDM wavelength output power may vary from transmitter to transmitter because of environmental changes, aging, or differences in power injected into the WDM stream. Different optical sources for either a WDM or white-light system are additionally subject to different amounts of attenuation over the extended network. Particularly, for a wavelength-routed transparent network, the WDM spectrum on a given fiber contains wavelength components which generally have traversed many diverse paths from different sources and with different losses and different impairment accumulation such as degradation of the optical signal-to-noise ratio or dispersion broadening. Further, wavelength multiplexing and demultiplexing usually rely on optical effects, such as diffraction or waveguide interference, which are very sensitive to absolute wavelength, which cannot be precisely controlled.

EDFAs or other optical amplifiers may be used to amplify optical signals to compensate loss, but they amplify the entire WDM signal and their gain spectrum is typically not flat. Therefore, measures are needed to maintain the power levels of different signals to be the same or at least in predetermined ratios.

In a complex WDM or white-light network, a signal may be switched multiple times. Each switching event needs to maximize transmission of the optical signal and minimize cross-talk between channels. A maximum of 10 dB attenuation through the switch and a minimum of 30 dB channel isolation are typical requirements. However, MEMS cross-connects and their associated optics are subject to internal variations of optical characteristics and misalignments, both integral to the device and as a result of both manufacturing and environmental variation and non-uniformity and of mechanical stress, all of which result in switch states having a significant variation and instability of insertion loss when aligned according to their nominal settings.

As described above, it is well known that WDM systems must maintain a significant degree of uniformity of power levels across the WDM spectrum, so that dynamic range considerations at receivers and amplifier, non-linear effects, and cross talk impairments can be minimized. As a result, serious attention must be payed to equalization of power levels across the spectrum. This equalization should be dynamic and under feedback control since the various wavelength components vary in intensity with time and due to changes in optical channel routing history among the components. One object of this invention is to provide means of equalization at multiple-fiber WDM switching nodes where many beams from diverse sources are interchanged among the fibers.

Bishop et al. have disclosed in U.S. Pat. No. 6,263,123 a pixellated WDM cross connect using a two-dimensional array of micromirrors in which a signal beam of a particular carrier wavelength is distributed to a plurality of the micromirrors. The number of mirrors reflecting light to an output port determines the transmission coefficient through the switch. When such a pixellated intensity control is used in a WDM cross-connect, the mirrors are arranged in a two-dimensional array and are tiltable about two axes. The described system is used primarily for characterizing the optical signal, not for controlling it. Similarly, Derickson et al. have disclosed in U.S. Pat. No. 4,796,479 a system for monitoring the intensities of the WDM channels in a WDM cross connect with the main emphasis on determining the ratio of signal to noise. It would be desirable to integrate the capability of such systems into an optical network without unduly increasing the cost and complexity.

SUMMARY OF THE INVENTION

An optical switching system includes a plurality of optical switching elements controllable in two different scales or dimensions depending upon the switch architecture and designed to be able to effect both switching and control of the transmission coefficient. The power adjustment is particularly useful in a wavelength-division multiplexing optical switch in which the power is adjusted between different wavelength channels combined in an output path such as an optical fiber.

An example of such a switching element is a mirror tiltable about two orthogonal directions or tiltable in one dimension according to a fine and a coarse resolution. In one embodiment, tilting about a major axis is used to control switching between optical ports, and tilting about the minor axis is used to control the amount of optical power passing through the switch.

Such mirrors are advantageously formed in a micro electromechanical system (MEMS) array. A mirror may be tilted by two pairs of electrostatic actuator electrodes positioned beneath the mirror on opposed sides of two torsion beams supporting the mirror.

A portion of the switched output signal may be diverted to an optical power monitor to enable feedback control of the power adjustment. Dynamic power equalization advantageously involves monitoring of power levels for the individual WDM wavelength channels on each fiber in the system. This information provides feedback for the power equalization mechanism. Input power may be advantageously also monitored for each wavelength channel.

The minor axis tilt may also be used for optimizing transmission through the optical switch. After the position of maximum transmission is established, the transmission may be detuned. An example of two-axis switching is the use of a major axis optimized for switching between fibers and a minor axis for adjusting transmission, especially insertion loss, of the same optical channel. Another example is the use of a coarse control of one or more major axes for establishing a switch state connection in combination with a fine control along one or more minor axes (which may or may not be the same as the major axes) to moderate the degree of coupling of a wavelength channel between the chosen fibers for that wavelength service.

The feedback control applies as well to white-light switching systems in which the same mirrors are used for switching and for transmission optimization and power equalization.

The minor axis tilt may be used to increase the high insertion loss for any optical connection in the off state and may further be used to turn the switch to a hard off during switching between discrete optical paths.

DETAILED DESCRIPTION OF THE PREFERRED EMBODIMENTS

The invention includes an optical switching system in which the output power on particular channels is monitored to enable power adjustments in the optical switch, for example, adjustment of the transmission coefficient for an optical channel transmitted through the switch.

Figure 8:
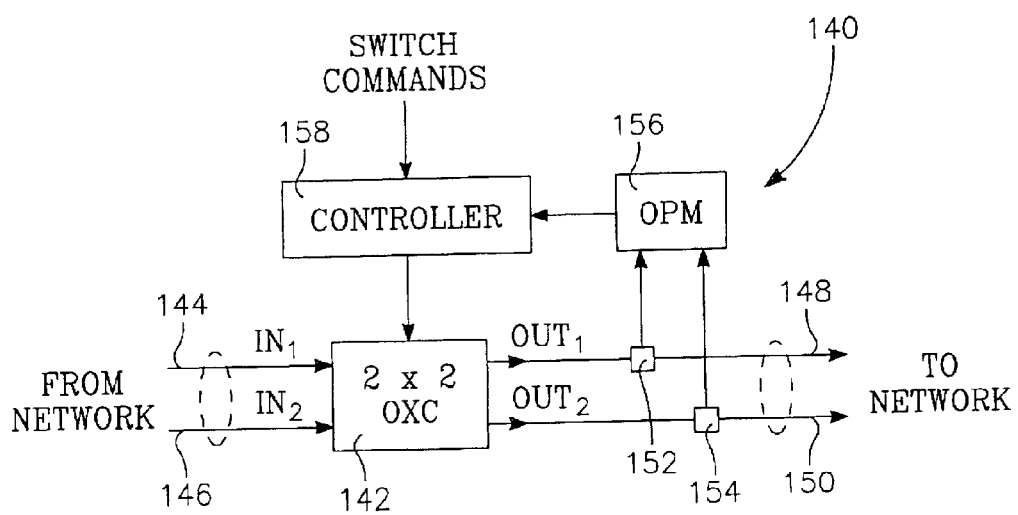
FIG. 8 is a block diagram of an optical switching system including an optical power monitor and feedback control.

A block diagram of one embodiment of a controlled transmissivity optical switching system 140 of the invention is illustrated in FIG. 8. A 2×2 optical cross connect (OXC) 142 links two input fibers 144, 146 connected to input ports $IN_1$, $IN_2$ to two output fibers 148, 150 connected to output ports $OUT_1$, $OUT_2$. However, the invention is directly applicable to a larger number of input and output fibers.

In the wavelength division multiplexing (WDM) embodiments of the invention, each fiber 144, 146, 148, 150 is capable of carrying a multi-wavelength WDM optical signals at wavelengths $\lambda_1$-$\lambda_N$. The OXC 142 is capable of switching the separate wavelength components on each input fiber 144, 146 to either of the output fibers 148, 150. This architecture applies as well to a WDM add/drop multiplexer (WADM) in which the input ports $IN_1$, $IN_2$ are associated respectively with the input (IN) port of the transmission fiber and the DROP port to the local node and the output ports $OUT_1$, $OUT_2$ are associated respectively with the output (OUT) port of the transmission fiber and the ADD port from the local node.

Often the number N of fibers may be a ten or even a few tens while the wavelength channel count W may exceed 100. In general, the switch states must be compatible with low inter-channel cross talk. For example, one rule that applies to wavelength routing is that no fiber wavelength slot can contain more than the corresponding wavelength content of a single input fiber. Two identical wavelength paths converging on a single fiber will interfere, resulting in significant signal degradation. This condition is often called a color collision. Of course, if the wavelength content contains separable sub-structure, such as microwave sub-carrier multiplexing, further sub-switching may be performed, but this is not generally possible in a transparent wavelength-division switch of the type discussed here.

In a white-light system, in contrast to a WDM system, the entire effective spectrum on one of several input fibers 144, 146 is switched to a selected one of the output fibers 148, 150. It is anticipated that white-light systems will utilize considerably more than two fiber channels Power taps 152, 154 connected to the output ports $OUT_1$, $OUT_2$ divert a small amount of the optical power of the respective optical signals to an optical power monitor (OPM) 156 which measures the power of the optical signals transmitted through the cross connect 142. In the case of a white-light switch, the power may be the total power on the fiber 148, 150 while in a WDM system the monitored power is preferably that of each of the wavelength-separated channels. The measured optical powers are supplied to a cross-connect controller 158 controlling the OXC 142. The cross-connect controller 158 sets up the cross connect 142 according to switch commands supplied from an unillustrated switch controller to effect selective switching between input and output ports. It additionally tunes the cross connect 142 to adjust the optical power transmitted through the cross connect 142 on a particular optical connection according to the measured power transmitted through that connection.

In a WDM cross connect, the optical power monitor 156 preferably measures the power on each of the WDM channels, and the controller 158 accordingly adjusts the power transmission for that wavelength channel through the cross connect 142. The optical taps 152, 154 and the optical power monitor 156 may be realized in several ways, all accomplishing the benefits of the invention. For an optical switch, the taps 152, 154 may be formed as Y-junctions of fused fibers disposed on the output ports of the OXC 142 in which the fiber carries a white-light or multi-wavelength WDM signal or as fiber directional couplers. Alternatively, when the switching is performed using free-space optical beam splitters which can divide the power of a beam into two beam directions. The optical power monitors 156 may be an optical spectrum analyzer scanning the WDM bandwidth or, as described below, it may be a variant of the optical cross connect in which the wavelength components are separated and then individually detected. Other forms are possible as long as the time for resolving the powers of different wavelength channels is sufficient for the time requirements of the power adjustments. If the adjustments are intended to only address aging and environmental effects, the resolved measurement time may be relatively long. On the other hand, fast feedback may be necessary for initializing switch states, for compensating for transient changes in power level such as occurs from the combination of polarization-dependent loss and polarization fluctuations which vary at the wavelength level, for stabilizing against vibration, and for alarm signaling to protection circuitry.

There are several criteria for adjusting relative power between channels. One straightforward criterion is that all wavelength channels on either output fiber 148, 150 should have the same intensity so that optical receivers and other components located downstream will detect wavelength channels of equal intensity. In another method, the wavelength-differentiated signals are pre-emphasized to have different intensities to, for example, compensate for non-flat wavelength response of a downstream component. Such a component may be an erbium-doped fiber amplifier (EDFA) amplifying the entire WDM spectrum but having a non-flat gain spectrum across the WDM bandwidth. The variable transmission through the cross connect 142 is adjusted to compensate for the EDFA gain spectrum. Thus, taking into account the possible need for pre-emphasis of the gain spectrum or other downstream spectral dependence, power control and feed back provides more generally for a programmable capability of adjusting insertion loss at the wavelength level. Pre-emphasis may be considered as a form of power equalization in which the power levels of different wavelength channels are adjusted to conform to a standardized non-flat spectrum resulting, for example, power equalized channels downstream of the cross connect.

The need for power adjustment, particularly for a WDM system, arises from a number of sources. The fibers are subject to environmental effects affecting their absorption. The cross connects are also subject to environment and aging effects in which their absorption changes over time. The signal absorption across the cross connect may vary according to the path selected and additionally according to the wavelength channel. The optical input signal may degrade as the laser producing it at some remote location ages or varies with temperature and other environmental effects. Many WDM components have insertion loss that varies with wavelength and with polarization, which tends to vary on an intermediate time scale. Furthermore, WDM signals have typically traversed many optical filtering elements such as multiplexers and such. As a result, the non-uniformity of channel loss as a function of wavelength or due to misalignment relative to the element passband produces a differential loss as a function of wavelength that may be substantial and may disadvantageously accumulate across an all-optical network segment. Particularly in a WDM network, the wavelength components carried by a single input fiber may have originated from different sources, and the originating sources may change with time. Power compensation at the output of an optical add/drop multiplexer allows the immediate compensation for the local sources producing the ADD channels. Power monitoring of the optical intensities, particularly of the local added channels, further allows system monitoring of components that are gradually degrading and allows timely maintenance or replacement of faulty parts.

The need for equalization in transparent optical cross connects is in no way limited to wavelength-selective cross connects. In the case of a white-light cross connect switching demultiplexed WDM traffic, the previous arguments also apply. In the case of a white-light cross connect switching aggregate (not wavelength separated) WDM or non-WDM optical traffic, the combined effects of receiver dynamic range, avoidance of non-linear thresholds, restrictions of power levels for amplifier inputs, variations of input power across a range of time scales from a number of sources together conspire to demand power stabilization within generally tight limits.

Figure 1:
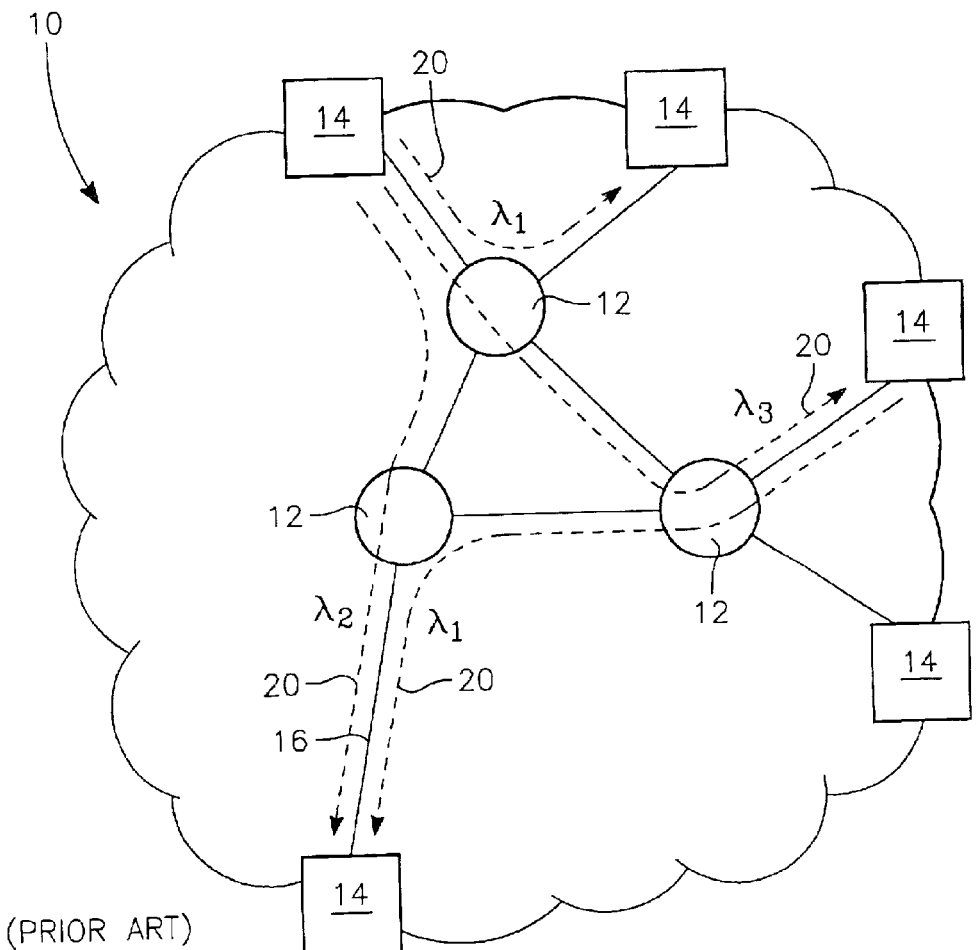
FIG. 1 is a network diagram of a complexly connected optical communications network.
Figure 2:
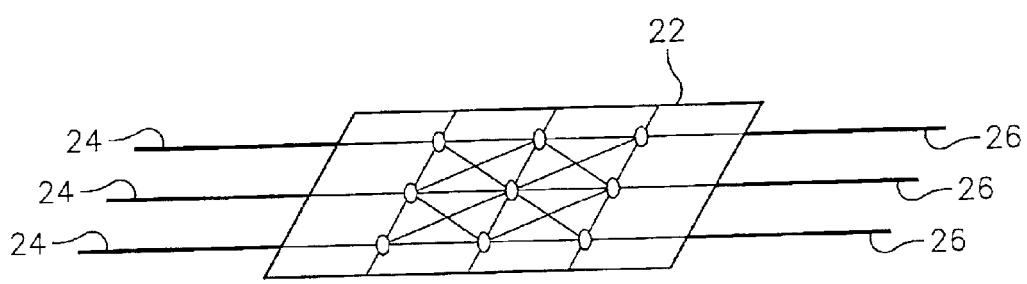
FIG. 2 is a general block diagram of a 3×3 wavelength division multiplexing optical cross connect (WOXC).
Figure 3:
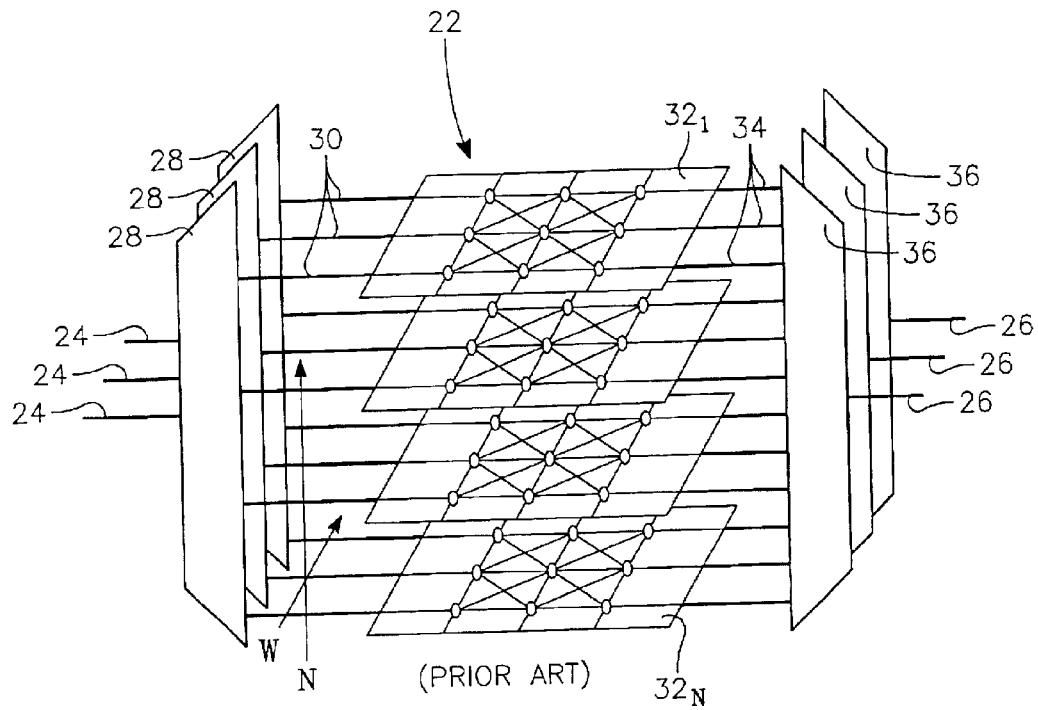
FIG. 3 is a more detailed block diagram of the WOXC of FIG. 2
Figure 4:
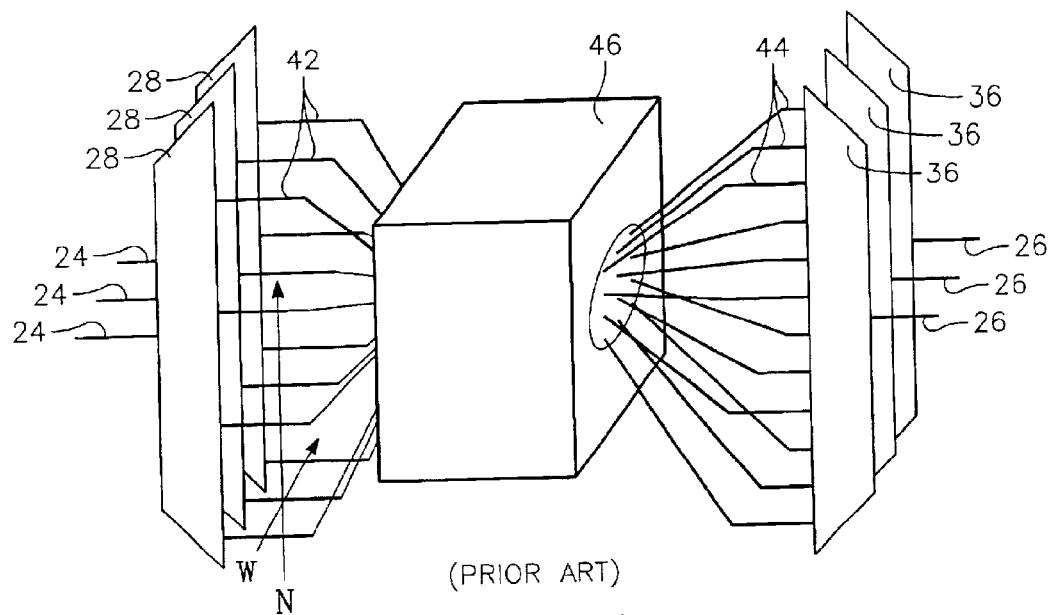
FIG. 4 is a block diagram of a more integrated version of the WOXC of FIG. 2.
Figure 5:
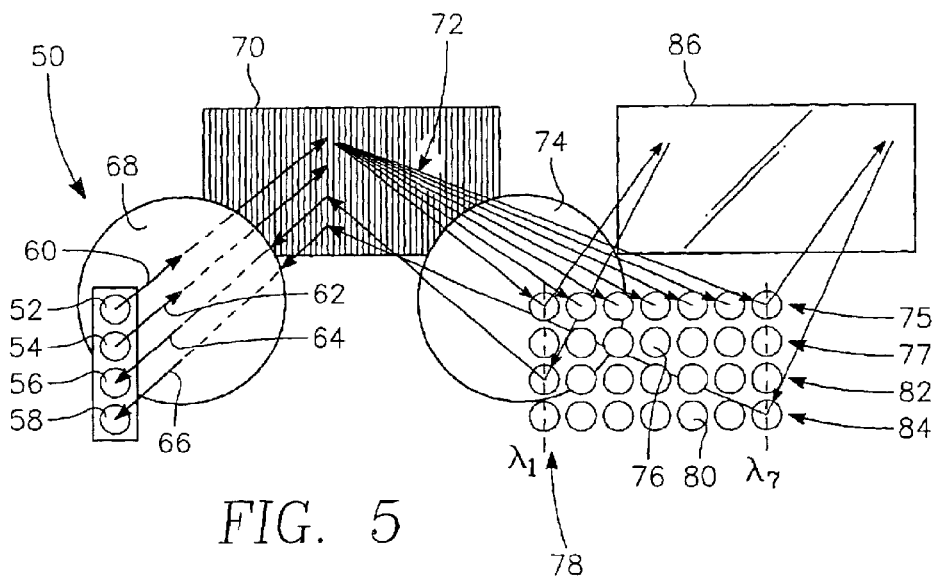
FIG. 5 is a schematic diagram of a WOXC using one array of micromirrors and a folding mirror.
Figure 6:
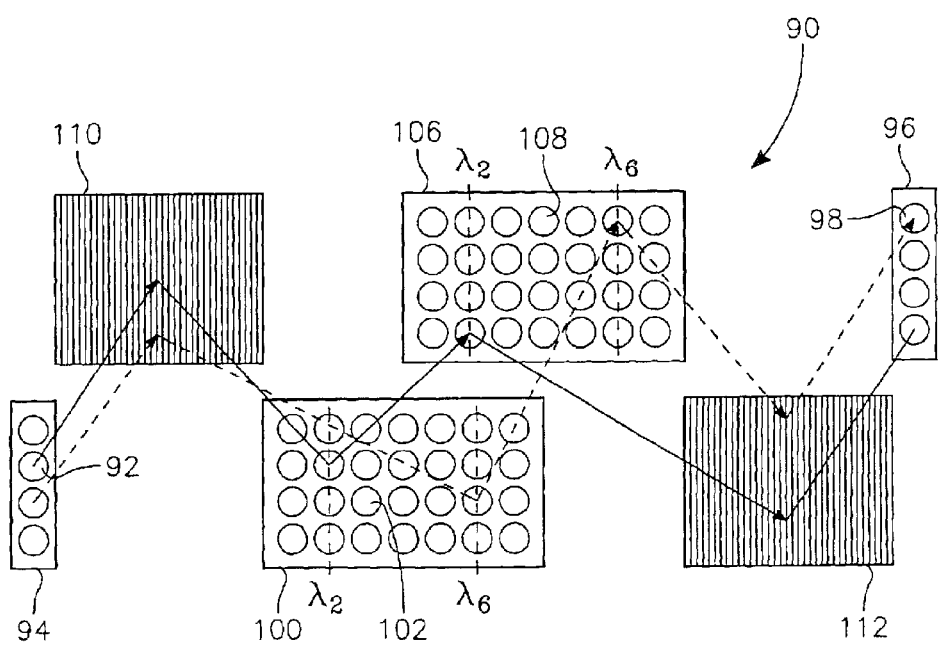
FIG. 6 is a schematic diagram of a WOXC using two arrays of micromirrors and no folding mirror.
Figure 7:
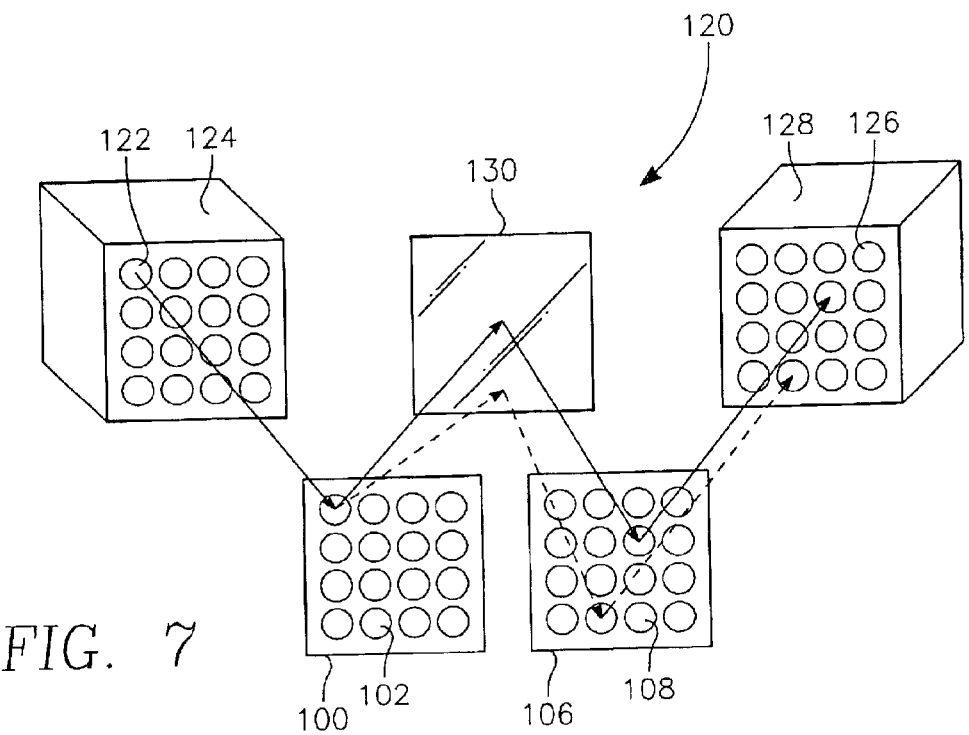
FIG. 7 is a schematic diagram of a white-light optical cross connect

The invention has been implemented in the context of several optical switching systems under development of the types illustrated in FIGS. 5, 6, and 7, but the inventive power adjustment is not so limited. Each of the described switching systems includes a micro electromechanical system (MEMS) array of mirrors preferably arranged in a two-dimensional array for either a wavelength division multiplexing (WDM) switching system or for a white-light system although the invention is not so limited. In a WDM system, one dimension of the array may correspond to input and output fibers and the other to wavelengths of the WDM comb. In a white-light system, the fiber beams are typically arranged in one or more two-dimensional arrays corresponding to the array of mirrors. In the described embodiments, the mirrors are tiltable in two directions, but several aspects of the invention are achievable with one-axis mirrors and other selectively transmissive elements. The mirrors are formed generally parallel to the face of the array with tilt angles of a few degrees from that face. As will be explained in more detail later, the MEMS array may be configured to switch in the fiber direction a one- or two-dimensional arrangement of input beams separated according to both fiber and wavelength to a corresponding arrangement of output beams.

There are many ways of achieving the MEMS array of micromirrors and their actuation. The following is an example. The MEMS array may be bonded to and have an array of solder bumps contacting it to a driver circuit including high-voltage circuitry needed to drive the electrostatic actuators associated with each of the mirrors. A controller controls the driver circuit and hence the mirrors in a multiplexed control system including address lines, data lines, and a clock line, driven in correspondence to an oscillator. The control is preferably performed according to pulse width modulation (PWM), as Garverick has described in U.S. patent application, Ser. No. 09/884,676, filed Jun. 19, 2001 and incorporated herein by reference in its entirety. In this method, a high-voltage square-wave common node drive signal is supplied through a power transistor to one set of electrodes for all the mirrors while the driver array delivers phase delayed versions of the square-wave signal to the other set of electrodes, the amount of delay determining the RMS voltage applied across the electrostatic actuator electrodes of each mirror.

The controller receives switch commands from the external system to effect switching of the wavelength separated channels between the fibers. The coarse pointing constants, which are primarily representative of the gross physical characteristics of the MEMS array and its driver circuit, may be stored in an electrically programable read-only memory.

According to one aspect of the invention, a small portion, for example, less than 10%, of the optical power of each of the output beams is split off to an optical power monitor. The power may be split from a wavelength-combined WDM signal external to the switch and thereafter spectrally analyzed. Alternatively, the optical power may be split from individual wavelength-differentiated beams internal to the switch. The optical intensities for all the fiber and wavelength-separated signals are demultiplexed and converted to analog or digital form and supplied to the controller, which then adjusts the mirror positions to adjust the transmitted power to conform to one or more predetermined criteria.

The invention is explained with reference to a 2×2 optical cross connect 160 illustrated in FIG. 9. However, it is emphasized that this four-fiber embodiment is illustrated only for simplicity. More complex cross connects, such as a 12×12 cross connect using twenty-four fibers, are being developed using the same design. In the 2×2 cross connect 160, four fibers 162, 164, 166, 168 are optically coupled to a concentrator 170, which uses planar waveguides 172, 174, 176, 178 to optically couple the fibers 162–168 to an output face 180 of the concentrator 170 adjacent the optics of the cross connect 160. Although, other coupling arrangements are possible, as suggested by Solgaard, the concentrator 170 offers some advantages. Its planar waveguides 172–176 horizontally concentrate and reduce the spacings therebetween of the fiber channels from the minimum of about 125 $\mu$m representative of fiber diameters to the considerably reduced spacings of, for example, 30 $\mu$m which are more appropriate for the magnifying optics of the switch and an optimum size and spacing of the mirrors.

For an add/drop multiplexer, the four fibers 162, 164, 166, 168 correspond respectively, for example, to IN, OUT, ADD, and DROP. An N×N cross connect can be implemented by increasing the numbers of fibers and planar waveguides although it is appreciated that this enlargement additionally constrains the design of the rest of the system. The output face 180 of one embodiment of the concentrator 170 is partially illustrated in the orthographic, partially sectioned view of FIG. 10.

The planar waveguides 172–178 are formed by diffusing in stripes of dopants in a top surface 182 of a substrate 184 of the concentrator 170 to form regions of a high-index core surrounded on its lateral sides and bottom by a lower-index portion of the concentrator board. In one embodiment, an unillustrated lower-index coating is applied over the top surface 182 of the substrate 184 and over the waveguides 172–178 to produce nearly symmetric optical waveguide modes. However, it is possible in some situations to rely upon an air interface on top of the waveguides 172–178 to confine the optical modes within the waveguides. Each of the waveguides 172–178 is coupled to a slightly divergent free-space beam 186, only one of which is illustrated. The waveguides 172–178 extend along a common plane allowing the output beams to propagate in patterns having central axes which are also co-planar.

Returning to FIG. 9, the outputs of the four planar waveguides 172–178 are placed at or near the focal point of a collimating lens system 188. The collimated beams, which propagate substantially within a common plane, are incident upon a diffraction grating 190 having grating lines extending parallel to the plane of the illustration so that the wavelength components are angularly separated perpendicularly to the plane of the illustration. The beams may overlap when they strike the grating 190, which wavelength separates the four beams into corresponding sets of wavelength-separated beams, only one set of which is illustrated. Various mirrors 192, 194, 196, 198, 200 are included to condense the overall size of the system with little significant influence on the overall operation.

A lens system 202 focuses the beams onto a MEMS mirror array 204, placing the gaussian waists of the beams at the mirror surfaces. The MEMS mirror array 204 of the illustrated system includes both input mirrors and output mirrors for each channel through the switch, that is, two input mirrors and two output mirrors for each wavelength for the illustrated four-fiber system which includes two input fibers and two output fibers. A fold mirror 206 optically couples the respective input and output mirrors. Advantageously, the micromirror array 204 and the fold mirror 206 are separated by a distance that is equal to the Rayleigh range of the input beams. The Rayleigh range is defined as the distance from the gaussian beam waist after which the beam diameter has increased in size by a factor of $\sqrt{2}$, a distance of $\pi\omega^2/\lambda$, where $\omega$ is the beam radius at minimum size. This condition minimizes the ratio of spot size to beam separation at the micromirror plane, minimizes the cross talk between beams, and reduces losses due to leakage around the mirror edges. Polarization independence is typically achieved by minimizing the polarization dependencies of the individual components, particularly the diffraction grating 190, and inserting a waveplate 208 at a point of system symmetry so that each beam spends half its round-trip route in each of two orthogonal polarization states. The illustrated configuration places the waveplate close to the MEMS array 204, but its placement will vary in other configurations.

The input and output mirrors are controlled in pairs to selectively direct the wavelength-separated optical signal from one of the input fibers 162, 164 to one of the output fibers 166, 168.

According to one embodiment of the invention, an optical monitoring system is incorporated by fusing two monitoring fibers 210, 212 to the output fibers 166, 168 to form Y-couplers 214, 216 coupling about 10% of the optical output power to the monitoring fibers 212, 216. An optical power monitor 218 receives the split power from the monitoring fibers 212, 216 and determines the optical power in each of the wavelength components of the WDM output signals. The optical power monitor 218 may be formed by replicating many of the components of the previously described system but placing a two-dimensional optical detector array at the position of the MEMS array 204 so that it receives wavelength-separated components of its plural input signals.

A controller 220 receives the outputs of the optical power monitor 218, or more specifically the detected optical intensities of the detector array, and accordingly readjusts the tilt positions of the micromirrors in the MEMS array.

Garverick et al. describe a type of optical power monitor usable with this system in U.S. Provisional Application No. 60/316,051, filed Aug. 30, 2001 and entitled OPTICAL PERFORMANCE MONITOR USING A MULTIDIMENSIONAL ARRAY OF PHOTODIODES. The optical detectors are typically implemented as reversed biased photodiodes in an opto-electronic integrated circuit which produce photocurrents nearly proportional to the optical intensities of reflected beams falling on respective ones of them. Garverick describes a form of read-out circuitry for such an optical power monitor in U.S. Provisional Application No. 60/316,171, filed Aug. 30, 2001 and entitled SIGMA-DELTA READOUT IC FOR MULTI-CHANNEL CURRENT-MODE SENSORS.

The optical monitoring system described above is external to the switching and has the advantage of monitoring all the optics and mirrors of the switch as well the insertion losses between the switch and the network fibers. It is considered that the fused Y-couplers 214, 216 are substantially invariant once in place. However, an internal optical monitoring system is possible. As illustrated for a switching system 222 in the schematic diagram of FIG. 11, a partially reflective mirror plate 224 is positioned obliquely to the two-dimensional array of beams close to the MEMS array 204 so that the output beams are directed to respective optical detectors in an optical detector array 226 of the sort previously described. The controller 220 reads the two-dimensional array of optical intensities to accordingly control the mirrors in the detector array 204. While this system monitors the micromirrors, it is not fully sensitive to insertion losses nor to misalignments of the output optics.

Equalization is achieved in the above embodiments with relatively minor additions to the hardware other than the optical power monitor. The mirrors used for switching between channels and for optimizing transmission are used additionally for the variable attenuation of the output power, thereby effecting variable transmission through the switch. To achieve such variable attenuation external to the switch would require separate attenuators in each of hundreds of optical channels. Even the control functions can be incorporated into the same computerized controller.

It is preferred that the power taps of the optical power monitor be connected to the output beams or fibers to better control equalization and mirror optimization. However, it is possible and may be advantageous, as illustrated for the system 228 in the schematic diagram of FIG. 12, to also measure the intensities of the input beams using additional power taps 230, 232 on the input fibers 144, 146 supplying split optical powers to another optical power monitor 234, which supplies the measured input powers to the cross-connect controller 158. The ratio of input to output power provides the important parameter of insertion loss. Further, measurement of the input powers monitors the performance of the network upstream from the switch and allows alerting the network controller when the input power disappears or precipitously decreases. The combination of the input power monitor 234 and the output power monitor 156 allows ready isolation of faults within the cross connect 142.

Figure 13:
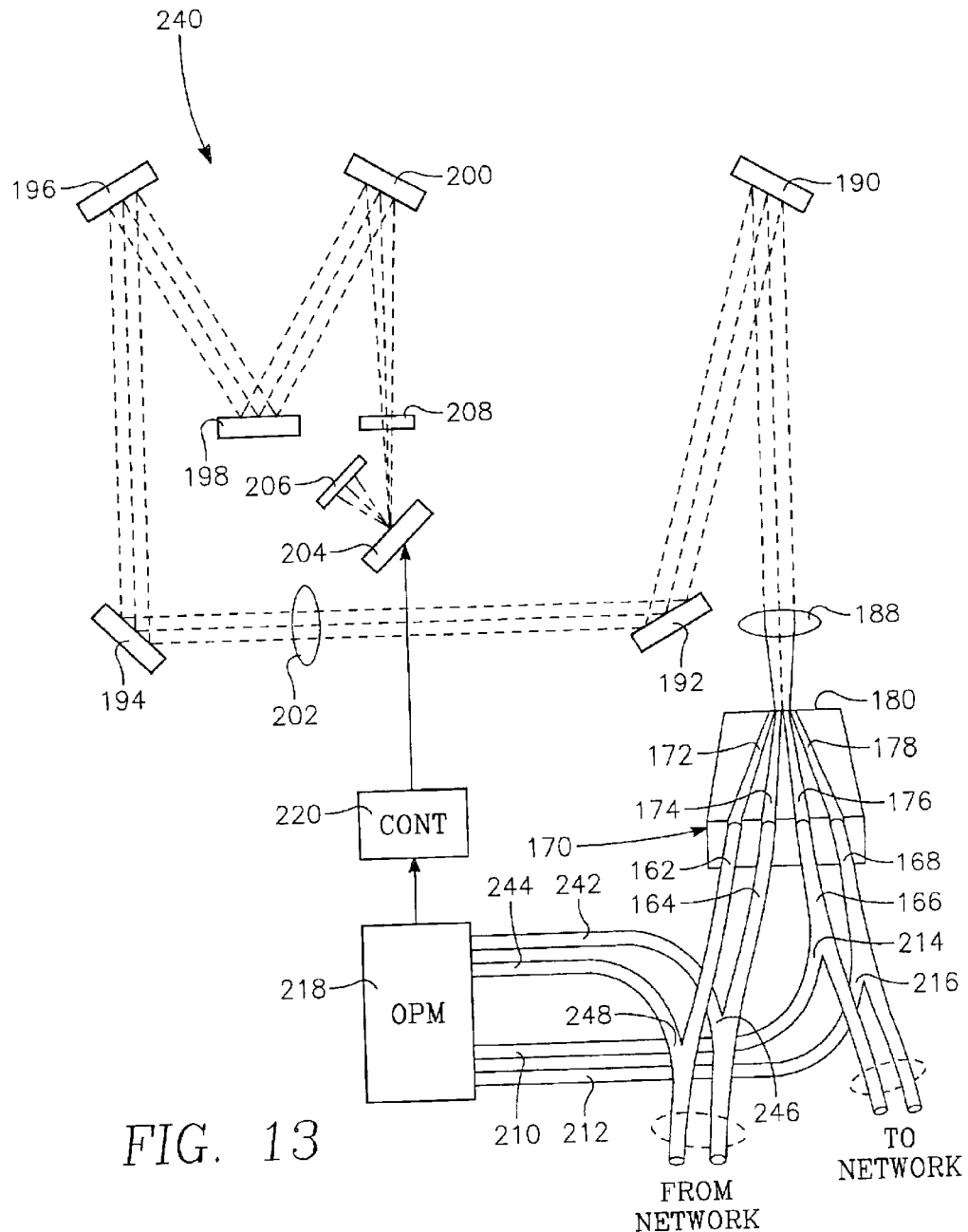
FIG. 13 is a schematic plan view of an improved of the WDM cross connect of FIG. 9 additionally including monitoring the input power.

This additional functionality may be simply implemented, as illustrated for a switching system 240 in the schematic diagram of FIG. 13, by including additional monitoring fibers 242, 244 fused to the input fibers 162, 164 to form Y-couplers 246, 248 but oriented in the opposite direction as the Y-couplers 214, 216 on the output fibers 166, 168. All of the monitoring fibers 210, 212, 242, 244 are coupled to the optical power monitor 218, which may have the same structure as discussed previously but accepting twice as many fibers.

Figure 11:
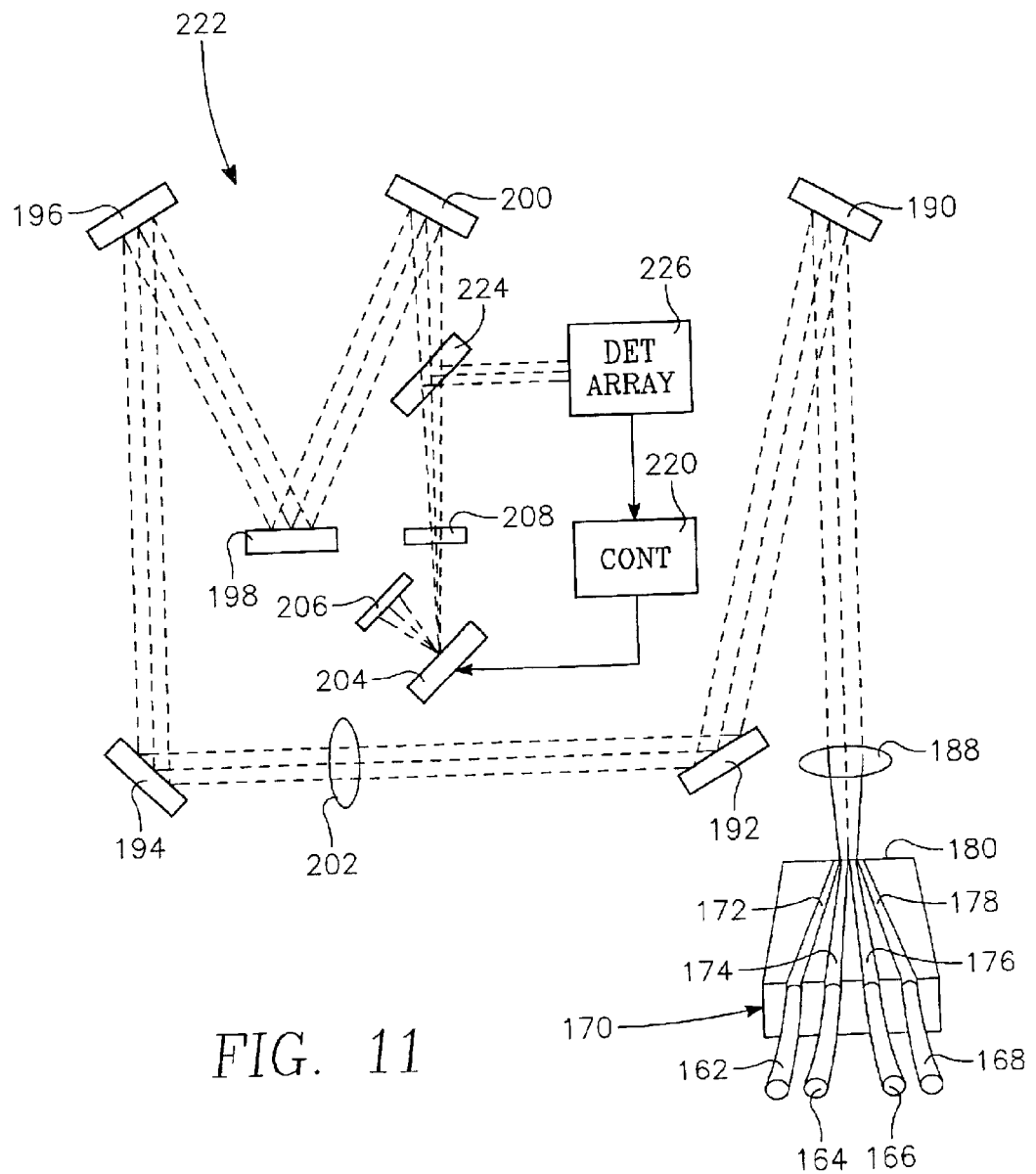
FIG. 11 is a schematic plan view of a 2×2 WDM cross connect using an internal external optical power monitor.

The internal optical monitoring system of FIG. 11 may be adapted for both input and output monitoring by positioning another detector array 226 on the opposite side of the partially reflective mirror plate 224 to accept light reflected from the mirror plate 224 originating from the input fibers 162, 164.

Figure 9:
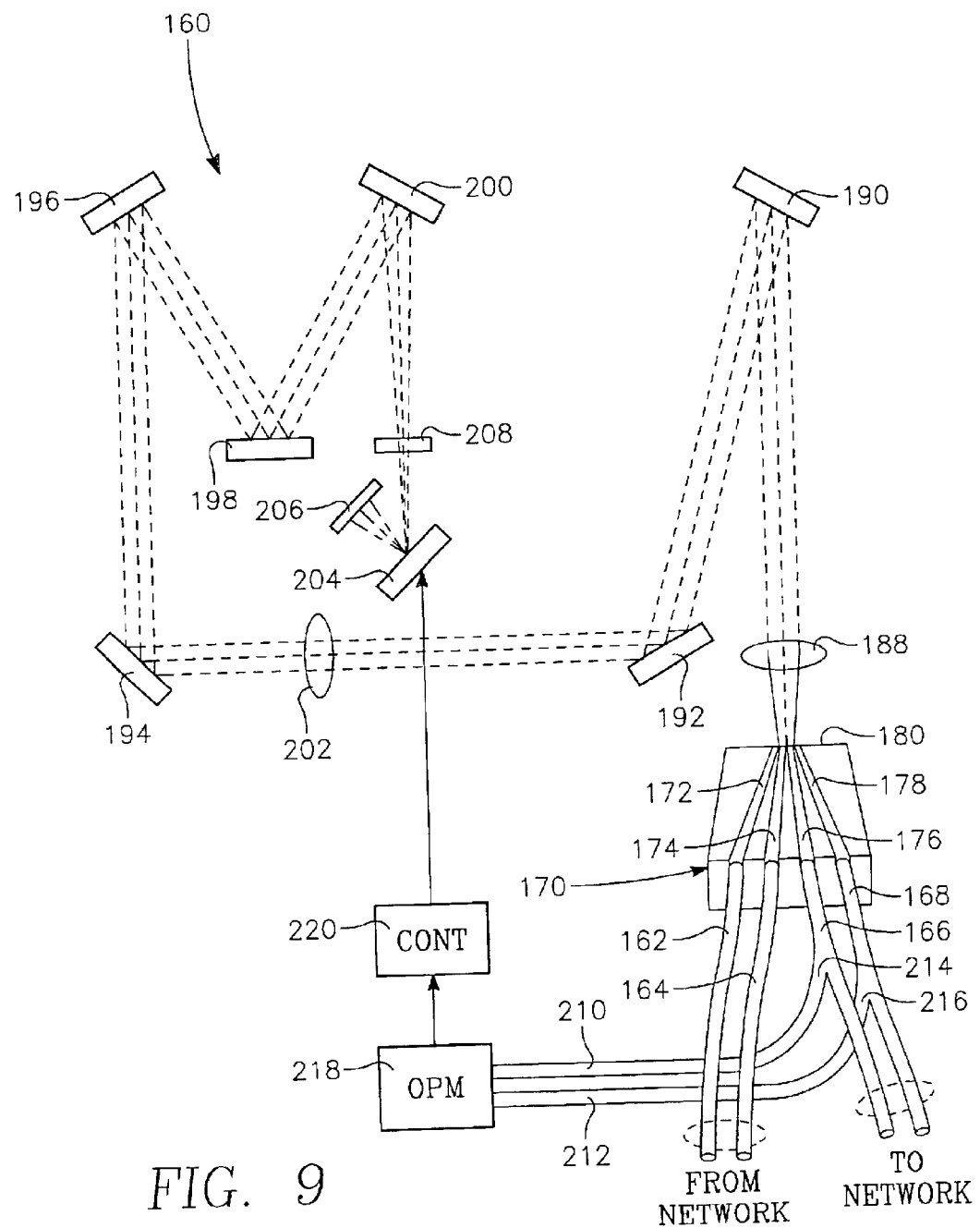
FIG. 9 is a schematic plan view of a 2×2 wavelength division multiplexing (WDM) cross connect using an external optical power monitor.

The invention is not limited to the optical systems of FIG. 9, and many variations are possible, for example, elimination of the fold mirror so that a single tiltable mirror links a wavelength component between an input and an output fiber or, more preferably, as illustrated in FIG. 6, an array of input mirrors is directly coupled to an array of output mirrors.

Furthermore, the optical switching system can be easily modified to a white-light system by eliminating the diffraction grating and bundling together the input and output fibers in a single one- or two-dimensional array with an appropriate one- or two-dimensional fiber management element with lenslets or, alternatively, a fiber concentrator with bulk-optic lensing, or both, or with separate one- or two-dimensional arrays of input and output fibers. The power equalization for white-light systems is again achieved with the same mirrors used for channel switching.

Figure 14:
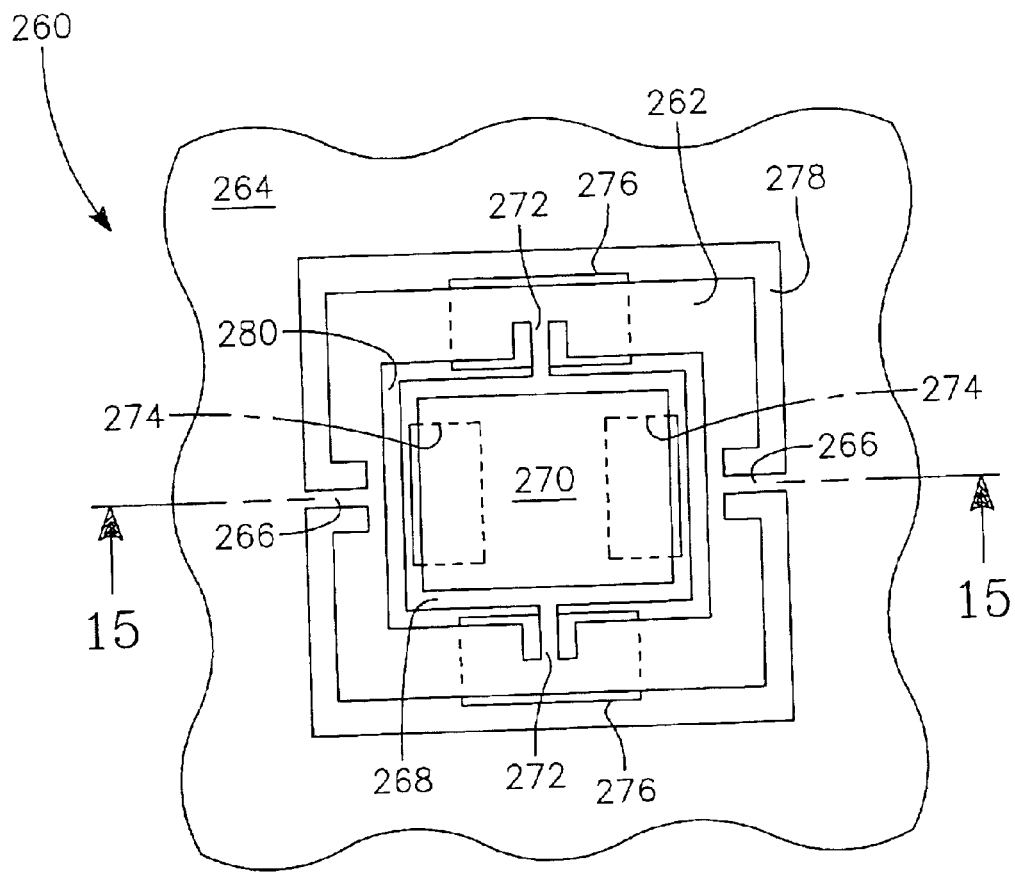
FIG. 14 is plan view of two-axis tiltable mirror usable with the invention.
Figure 15:
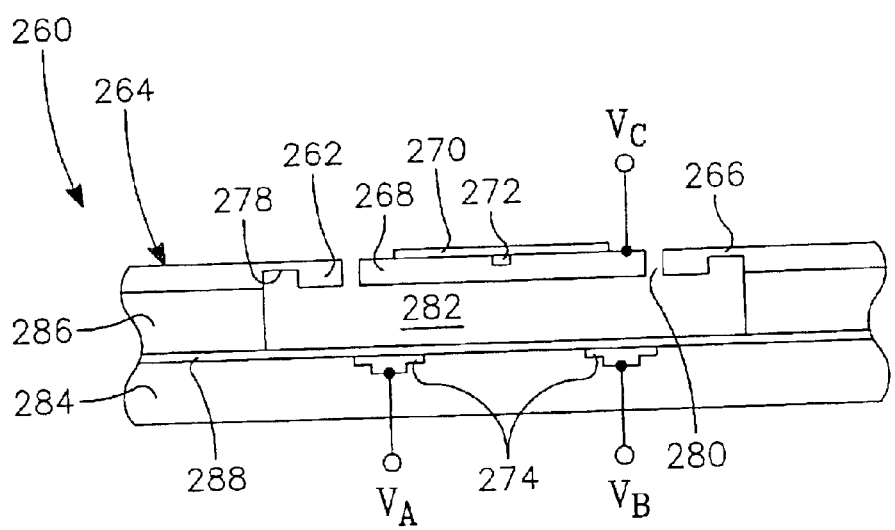
FIG. 15 is a cross sectional view taken along view line 15—15 of FIG. 12.

The MEMS array 204 is preferably formed as a two-dimensional array of dual-axis tiltable mirrors, one mirror 260 of which is illustrated in plan view in FIG. 14 and in cross-sectional view in FIG. 15 taken along view line 15—15 of FIG. 14. The cell is one of many such cells arranged typically in a two-dimensional array in a bonded structure including multiple levels of silicon and oxide layers in what is referred to as a multi-level silicon-over-insulator (SOI) structure. The cell includes a gimbal structure of an outer frame 262 twistably supported in a support structure 264 of the MEMS array through a first pair of torsion beams 266 extending along and twisting about a minor axis. The cell further includes a mirror plate 268 having a reflective surface 270 twistably supported on the outer frame 262 through a second pair of torsion beams 272 arranged along a major axis perpendicular to the minor axis and twisting thereabout. In one MEMS fabrication technique, the illustrated structure is integrally formed in an epitaxial (epi) layer of crystalline silicon. The process has been disclosed in U.S. Provisional Application, Ser. No. 60/260,749, filed Jan. 10, 2001, incorporated herein by reference in its entirety. However, other fabrication processes resulting in somewhat different structures may be used without affecting the present invention.

The structure is controllably tilted in two independent dimensions by a pair of electrodes 274 under the mirror plate 268 and another pair of electrodes 276 under the frame 262. The electrodes 274, 276 are symmetrically disposed as pairs across the axes of their respective torsion beams 266, 272. A pair of voltage signals $V_A$, $V_B$ are applied to the two mirror electrodes 174, and another pair of voltage signals are applied to the frame electrodes 276 while a common node voltage signal $V_C$ is applied to both the mirror plate 268 and the frame 262.

Figure 12:
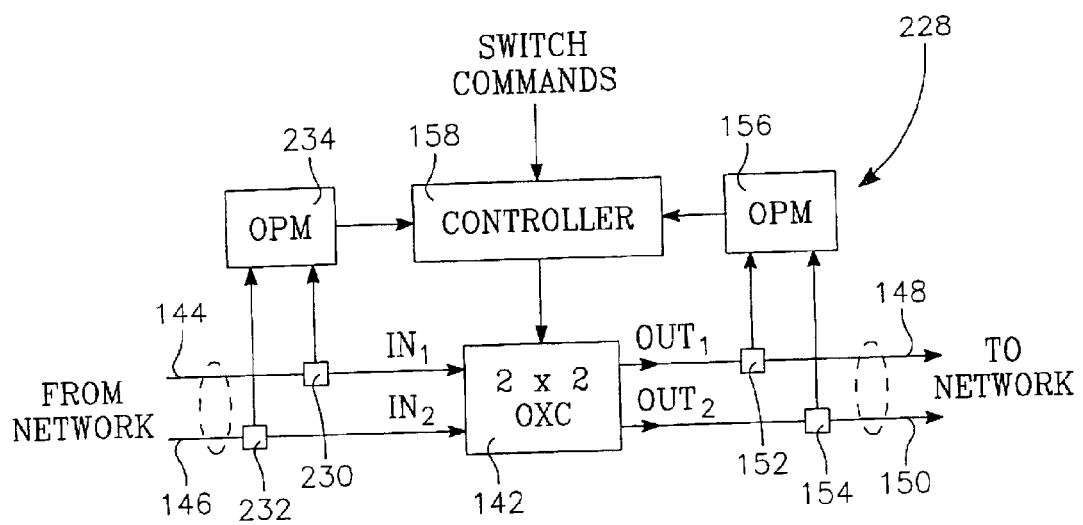
FIG. 12 is a block diagram block diagram of the optical switching system of FIG. 8 additionally including an input optical power monitor.

Horizontally extending air gaps 278, 280 are formed respectively between the frame 262 and the support structure 264 and between the mirror plate 268 and the frame 262 and overlie a cavity or vertical gap 282 formed beneath the frame 262 and mirror plate 268 so that the two parts can rotate. The support structure 264, the frame 262, and the mirror plate 268 are driven by the common node voltage $V_C$, and the frame 262 and mirror plate 268 form one set of plates for variable gap capacitors. Although FIG. 12 illustrates the common node voltage $V_C$ being connected to the mirror plate 268, in practice the electrical contact is made in the support structure 264 and electrical leads are formed on top of the torsion beams 266, 272 to apply the common node voltage signal to both the frame 262 and the mirror plate 268 which act as a top electrodes. The electrodes 274, 276 are formed at the bottom of the cavity 282 so the cavity forms the gap of the four capacitors, two between the bottom electrodes 272 and the frame 262, and two between the bottom electrodes 274 and the mirror plate 268.

The torsion beams 266, 272 act as twist springs attempting to restore the outer frame 262 and the mirror plate 268 to neutral tilt positions. Any voltage applied across opposed electrodes exerts a positive force acting to overcome the torsion beams 266, 272 and to close the variable gap between the electrodes. The force is approximately linearly proportional to the magnitude of the applied voltage, but non-linearities exist for large deflections. If an AC drive signal is applied well above the resonant frequency of the mechanical elements, the force is approximately linearly proportional to the root mean square (RMS) value of the AC signal. In practice, the precise voltages needed to achieve a particular tilt are experimentally determined.

Because the capacitors in the illustrated configuration are paired across the respective torsion beams 266, 272, the amount of tilt is determined by the difference of the RMS voltages applied to the two capacitors of the pair. The tilt can be controlled in either direction depending upon the sign of the difference between the two RMS voltages.

As shown in FIG. 15, the device has a large lower substrate region 284 and a thin upper MEMS region 286, separated by a thin insulating oxide layer 288 but bonded together in a unitary structure. The tilting actuators are etched into the upper region, each actuator suspended over the cavity 282 by several tethers. The electrodes are patterned onto the substrate, which can be an application specific integrated circuit (ASIC), a ceramic plate, a printed wiring board, or some other substrate with conductors patterned on its surface. The actuators in the upper region form a single electrical node called the "common node". Each actuator is suspended above four electrodes, each electrode being isolated from every other electrode. To cause the actuator to tilt in a specific direction, an electrostatic force is applied between the actuator and one or more of its electrodes by imposing a potential difference between the common node and the desired electrode. Each actuator has two pairs of complementary electrodes, one causing tilt along the major axis and the other causing tilt along the minor axis. Fabrication details are supplied in the aforementioned Provisional Application No. 60/260,749.

Figure 16:
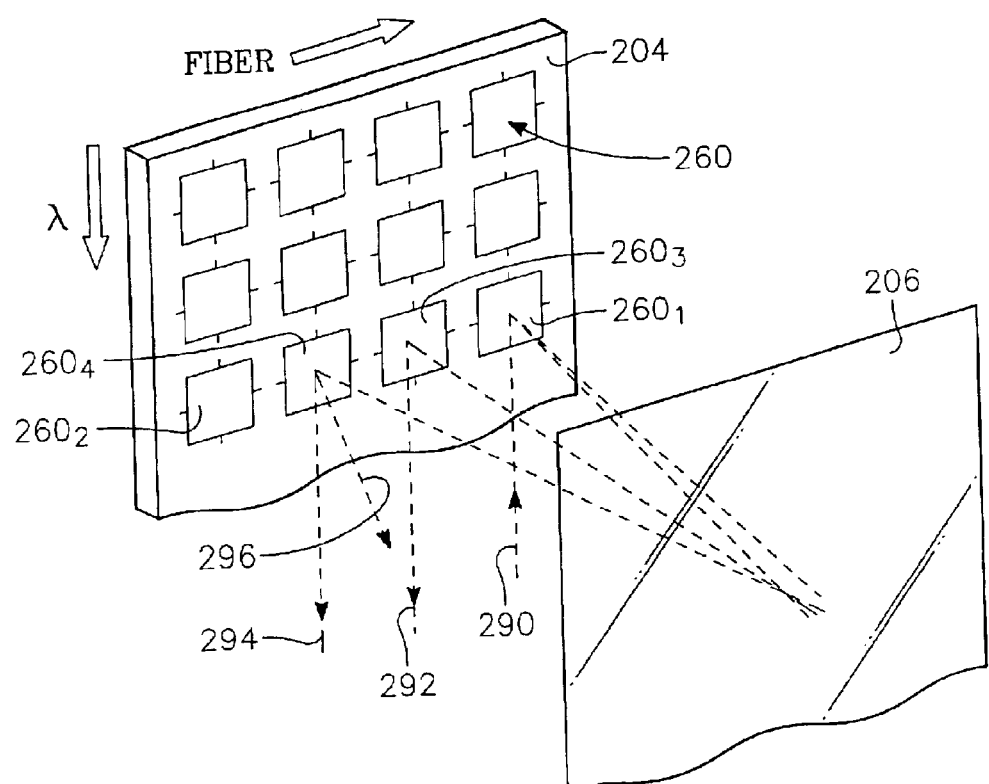
FIG. 16 is a schematic orthographic view of a mirror array and its fold mirror.

The MEMS array 204 is illustrated orthographically in FIG. 16 having the two-dimensional array of two-axis tiltable mirrors 260. For a WDM cross connect, the mirrors 260 are arranged within the array in a fiber direction and in a wavelength ($\lambda$) direction. Although the figure shows the embodiment including a fold mirror and a single array of mirrors, the following comments apply equally well to the embodiment having separate arrays of input and output mirrors directly coupled to each other without the use of a fold mirror. Only three wavelength-separated rows are illustrated. The optical switching is performed only within respective wavelength-separated rows. For example, an input beam 290 is incident upon a first input mirror $260_1$ and is reflected therefrom to the fold mirror 206. The operation of second input mirror $260_2$ is similar to that of the first. The input mirror $260_1$ is tiltable about its major axis, illustrated as vertical, so that its reflected beam, after being reflected from the fold mirror 206, strikes either a first output mirror $260_3$ or a second output mirror $260_4$ to produce respective a first output beam 292 or a second output beam 294. The major-axis tilts of the first and second output mirrors $260_3$, $260_4$ are controlled in somewhat complementary fashion to those of the input mirrors $260_1$, $260_2$ so that the output beams 292, 294 approximately follow the same path regardless of which input mirror $260_1$, $260_2$ produces that output beam. The above describes the principal switching operations using the one mirror tilt axis.

The other mirror tilt axis, the minor axis, can be used for power adjustment as well as for tuning for instrumental effects in the optical components. Assuming that the gross switching angles of the major tilt axes are set to couple the first input beam 290 to the second output beam 294, the first input mirror $260_1$ can be tilted about its second (minor) tilt axis (extending generally horizontally as illustrated) so as to produce an adjusted second output beam 296 that is vertically displaced from the unadjusted second output beam 294. However, it is anticipated that the major control for equalization will be effected by tilting the output mirror $260_4$ about its second tilt axis to set the angular direction of the adjusted second output beam 296 and thereby control the position on the concentrator at which the output beam falls, thereby controlling the coupling between the output beam and the output waveguide.

In a white-light cross-connect, there is no wavelength direction in the array. For a two-dimensional array of input fibers, the mirrors in the array typically have the same arrangement as the fibers. If desired, tilting about the second axis is not required if equalization is performed about the first, channel switching axis. However, the second axis tilting is nonetheless desired for optimization. It is noted that a one-dimensional array of MEMS mirrors may be advantageously used in a white-light system in which each of the input and output fibers are aligned in respective linear arrays or in a single linear array.

Figure 10:
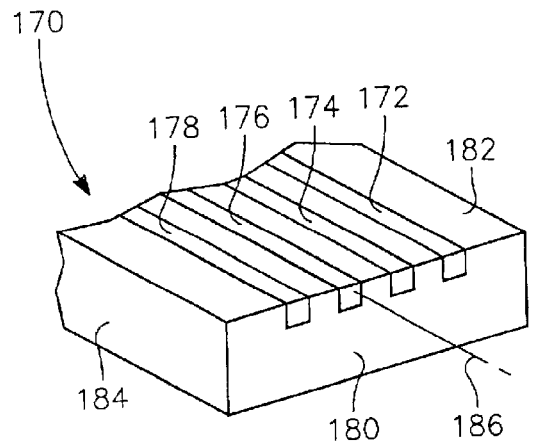
FIG. 10 is a sectioned orthographic view of a concentrator included in the cross connect of FIG. 9.

The fundamental control mechanism of the optical switches based on tilting mirrors is the degree of coupling between the free-space optical beams within the switch and the waveguides of the concentrator 170, for example, as already illustrated in FIG. 10, between the beam 186 and the concentrator waveguide 176. On the simplest level, if the beam 186 is not aligned with the waveguide 186, the two are not coupled. If the beam 186 is instead aligned with another waveguide 172, 174, 178, then it is coupled to that waveguide. More rigorously, the coupling M between a beam and a concentrator waveguide is given by $$M=\int\int \Psi_{beam}(x, y)\Psi^*_{conc}(x, y)dxdy,$$

where $\Psi_{beam}$ is the complex optical modal field of the beam, $\Psi_{conc}$ is the complex optical modal field of the concentrator waveguide, and the integral is taken across the two-dimensional interface between the beam and waveguide, which is assumed to be at a fixed value of z. The equation ignores normalizing constants of the two fields. If the two modal fields are congruent, M=1.

The above coupling equation applies to both switching to a different output port and for optimizing transmission and equalizing power levels. However, switching usually involves nearly complete changes of adjusting from very small transmission coefficients, for example, of less than 1% to transmission coefficients above, for example, 50% while optimizing and equalization involves only fractional changes, for example, between 10% and 100%.

Figure 17:
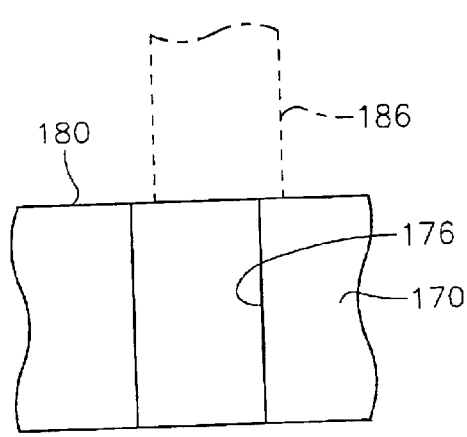
FIGS. 17 and 18 are cross-sectional views illustrating two kinds of mismatch in optically coupling two beams.
Figure 18:
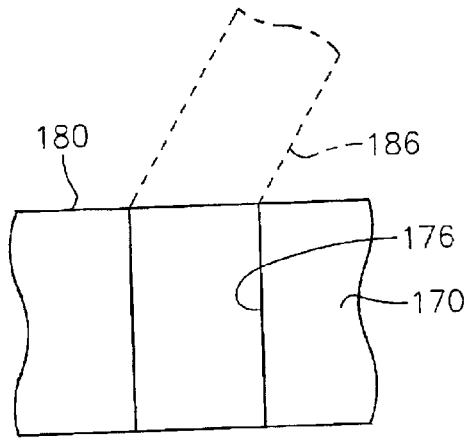

There are two principal types of misalignment or mismatch between the beam and waveguide. Positional mismatch occurs when, as illustrated in the cross-sectional view of FIG. 17, the central axis of the beam 186 is offset slightly from the central axis of the waveguide 176. The figure, being suggestive only, does not illustrate the smooth variation of the optical fields both inside and outside of the illustrated beam 186 and waveguide 176 and across the lateral interface. The figure further assumes that the two modal fields have the same width, which is the typical object of optical design. On the other hand, angular mismatch occurs when, as illustrated in the cross-sectional view of FIG. 18, the beam 186 is angularly inclined with respect to the waveguide 176 even if their central axes cross at their interface. Angular mismatch degrades the coupling because a phase mismatch occurs between the two fields at the interface arising from the axial z-dependence of the two complex fields. It has been found that coupling is degraded by about 1 dB per micrometer of positional mismatch and by about 1 dB per degree of angular offset but the angular dependence depends strongly upon the optics. It should be appreciated that a beam can be both positionally and angularly mismatched with a waveguide. It should be yet further appreciated that the mismatch can occur at the input fiber and its beam field defined by the rest of the optical system. The use of both an input and an output mirror, each of which are separately tiltable, allows the control between positional and angular mismatching although equalization control is more easily confined to the output mirror.

Two-axis tiltable micromirrors have been proposed before for white-light cross connects because the white-light fibers are generally arranged in two-dimensional arrays. It is believed that two-axis tiltable micromirrors are novel for WDM systems where typically there is a limited number of fibers that can be arranged in a linear array. Hence, for such WDM systems, two-axis tilting is not inherently required. However, two-axis tilting in WDM system allows not only equalization but also optimization within a single channel of the switching system in view of manufacturing variability and aging of the other optical components of the system. Such optimization in the orthogonal direction is desirable even if inter-channel equalization is not an issue because manufacturing and environmental conditions cannot be infinitely controlled. Further, the degree of minor axis tilting can be limited to no more than 10% of the tilting in the major axis. This limited minor-axis tilt range becomes important as the number of WDM fibers increases to 8 and beyond for switching systems of increased complexity. Two-axis tiltable mirrors are more easily designed when only one axis requires increased tilting to reach an increased number of fiber ports. It has been stated before that for WDM channel switching may be performed by tilting the mirrors about their major axes and that power adjustment performed by tilting the mirrors about their minor axes. However, the situation is more complex.

Tilting about the major axis can be performed both at the large angles corresponding to the positions of the mirrors and at finer angular resolution within the large angles. The finer tuning can be used to adjust power either for optimization or for equalization. That is, the major axis tilt can be used for both channel switching and power equalization. However, power detuning about the major axis incurs the possible problem of increasing cross talk. Moving a beam off maximum alignment with its waveguide in the direction of a closely neighboring waveguide may increase the cross talk between the two channels. On the other hand, minor axis tuning seems to affect the pass band. An optimization technique, rather than equalization, involves aligning the minor axis to improve angular alignment arising from mirror offset.

White-light MEMS switches for interconnecting fibers arranged in two-dimensional bundles need both tilting axes to effect channel switching between arbitrary pairs of the fibers. Nonetheless, power equalization can be achieved by partial tilting in either of the two tilt directions or perhaps in an oblique direction.

Power tuning or equalization needs to be distinguished from optimization tuning in which the tilt positions producing maximum coupling are established. Calibration tuning is typically a dynamic hunt for the tilt positions about both the major and minor axes producing maximum intensity of signal detected by the optical power monitor. Once the peak is found, the transmission may be detuned, preferably by tilting the output mirror about its major or minor axis away from the maximum overlap of the output beam with the output waveguide.

Each time an input optical signal is routed to a new output fiber, the microprocessor reads the optimum position settings for both axes of both the input and output mirrors associated with this routing combination and sets the mirror positions accordingly. Optimum mirror settings may have changed since this routing combination was last used due to changes in environmental conditions, such as vibration, thermal expansion, fiber stress, etc., so the microprocessor will then need to hunt for a new maximum in measured power by making small adjustments to the mirror settings, using, for example, a gradient descent algorithm, until the positions of peak intensity are determined.

Once the transmission coupling is optimized, the power of the output signals may be intentionally degraded to obtain equalization or other adjustment of power with the other output signals. Equalization may be achieved by reducing the angle on the minor axis until equalization is obtained following Newson's method in which the new minor-axis angle is estimated by computing the change in power necessary to obtain equalization divided by the angular derivative of power. This method is repeated until equalization is obtained. The derivative of the output power with minor-axis position must be learned by the microprocessor. Each time a mirror is adjusted to a new position, the angular derivative is computed using the measured change in power divided by the commanded change in angle.

Alternatively, the power detuning may be accomplished by using the difference between the the measured power and the desired power as an error signal and adjusting to reduce the error signal.

Rather than calibrating for maximum transmission, the optimization may be used to flatten the wavelength passband of the optical switch.

Figure 19:
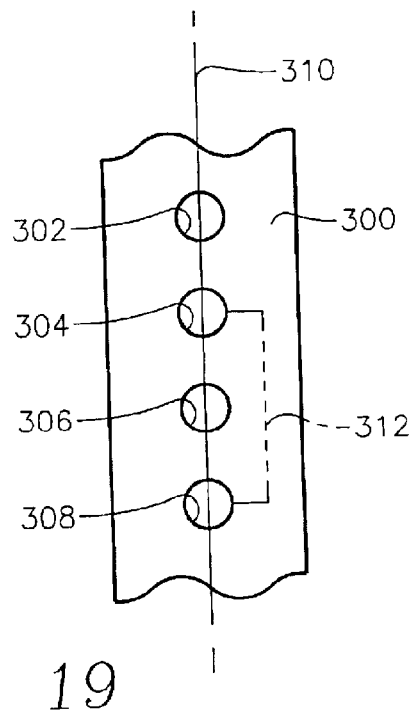
FIG. 19 is an elevational view of a concentrator of FIG. 10 illustrating a method of switching between two output beams.

Another application of the dual-axis power tilting of the invention arises particularly in more complex switches having three or more output fibers. As illustrated in the plan view of FIG. 19, a concentrator 300 includes one input waveguide 302, from which the optical switch selectively connects a wavelength channel to one of three output waveguides 304, 306, 308, all the waveguides 302-308 being disposed along a facial axis 310 in the output face of the concentrator 300. If at some time the switch is connecting one wavelength channel from the input waveguide 302 to the closest output waveguide 304 but is then instructed to reconfigure the connection to the farthest output waveguide 308, the most apparent method of readjusting the mirrors would change the mirror tilts about the major axis, whereby any optical power emanating from the input waveguide 302 is swept along the facial axis 310 from the closest to the farthest output waveguide 304, 308. However, at some time during the sweep, the radiation coincides with the intermediate output waveguide 306, which is not involved in either of the connections. The radiation spuriously induced in the intermediate output waveguide 306 will momentarily produce severe cross talk.

Another aspect of the invention allows the beam being switched to be turned off hard, preferably to at least −40 dB, by using the mirrors to cause the switching beam to follow an offset path 312 involving first a minor axis tilt in the wavelength direction away from the facial axis 300, secondly a major axis tilt in the fiber direction, and third a minor axis tilt toward the facial axis 300 to steer the beam to become coincident with the desired output waveguide 308 while avoiding the intermediate output waveguide 306.

Although the invention has been explained in the context of a multi-wavelength WDM switching system, many of the aspects of the invention can be applied to a white light switching system in which no wavelength separation is performed.

Further, although the invention has been described for use with a MEMS array of mirrors tiltable about central torsion beams, many of the aspects of the invention may be used with other types of optical switching elements. The mirrors may be movable in motions other than the central tiling of the described embodiment. Other types of switching elements were described briefly in the background section. Preferably, however, the optical switching elements include the capability of spatially steering beams to effect both fine and coarse adjustments. In the case of mirrors, the adjustments may be made by tilting in perpendicular directions for two-axis mirrors or in the same direction. The dual-axis control of the invention provides increased flexibility and performance of an optical switching switching.

For the many aspects of the invention including aspect of power equalization, it is not required that free-space optics be used either for the dispersion, the switching, or the power adjustment.

The invention allows for substantially increasing the capability in optical cross connects while only slightly increasing the cost or complexity.

What is claimed is:

1. An optical switching system comprising:
    at least one movable mirror for selectively coupling an optical signal from an input port to any of a plurality of output ports according to a position of said mirror;
    an optical detector receiving a portion of light coupled to one of said output ports to measure an intensity of said light; and
    a controller receiving an output of said optical detector and in response adjusting said position of said mirror to effect control of said intensity.

2. The system of claim 1 comprising a plurality of said mirrors, a plurality of said optical signals from a plurality of said input ports, and a plurality of said optical detectors receiving portions of light coupled to each of said mirrors and wherein said controller adjust said position of at least one of said mirrors to control relative sizes of two of said intensities.

3. The system of claim 2 further comprising a dispersive element for spatially separating said plurality of multi-wavelength signals into said plurality of said optical signals.

4. The cross connect system of claim 1 further comprising a second optical detector receiving a portion of light coupled to one of said input ports.

5. The system of claim 1, wherein said movable mirror is a tiltable mirror and wherein said position is a tilt position.

6. A cross connect system for selectively and optically interconnecting a plurality of optical input channels to a plurality of optical output channels, comprising:
    a controller
    an optical cross connect controlled by said controller and capable of switching signals from one of said input channels to a selected one of said output channels under control of said controller, wherein said optical cross connect includes a plurality of tiltable mirrors for reflecting light from respective ones of said input channels to selected ones of said output channels; and
    an optical power monitor tapping portions of power of said output channels to determine intensities of optical signals on each of said output channels;
    wherein said controller in response to intensities determined by said optical power monitor fractionally adjusts one or more optical power transmission coefficients between one of said input channels and said selected one of said output channels of said optical cross connect and wherein said controller controls tilt angles of said mirrors to select said output channels and to fractionally adjust said power transmission coefficients.

7. The cross connect system of claim 6, wherein said tiltable mirrors are included in a micro electromechanical system array.

8. The cross connect system of claim 6,
    wherein said input channels are included as wavelength components in a plurality of multi-wavelength input signals, and
    further comprising a dispersive element dispersing said multi-wavelength input signals into spatially separated ones of wavelength components incident upon respective ones of said mirrors.

9. The cross connect system of claim 7, wherein said mirrors are tiltable along a first direction and along an orthogonal second direction.

10. The cross connect system of claim 9, wherein said controller controls a switching route between said input channels and said output channels by tilting said mirrors only along said first direction.

11. The cross connect system of claim 10, wherein said control tilts said mirrors along said second direction to effect one of transmission optimization and power transmission through said system.

12. The cross connect system of claim 9, wherein said controller controls a switching route between said input channels and said output channels by tilting said mirrors along both said first direction and said second direction.

13. The cross connect system of claim 6, wherein said controller adjusts at least some of the power transmission coefficients to be less than maximum values thereof.

14. A wavelength division multiplexing cross connect for interconnecting selected wavelength components in a plurality of primary input beams to a plurality of primary output beams, comprising:

a wavelength-dispersive element receiving from an output side of said cross connect said plurality of primary input beams and said plurality of primary output beams to thereby create a two-dimensional array of secondary beams arranged in one direction according said primary beams and in a second direction according to wavelength; and a two-dimensional array of mirrors tiltable about respective first and second axes and positioned to receive respective different ones of said secondary beams to reflect therefrom respective tertiary beams.

15. The cross connect of claim 14, further comprising a fold mirror positioned to reflectively couple respective pairs of said tertiary beams.

16. The cross connect of claim 14, wherein tilting of said mirrors about said first axes effects switching from one of said primary input beams to a selected one of said primary output beams.

17. The cross connect of claim 14, wherein tilting of said mirrors about said second axes effects control of transmissivity through said cross connect.

18. The cross connect of claim 17, wherein tilting of said mirrors about said first axes also effects control of transmissivity through said cross connect.

19. The cross connect of claim 14, further comprising an optical power monitor measuring output power of each wavelength component of each of said primary output beams and therefrom controlling said tilting of said mirrors to effect a fractional change in power transmission through said cross connect.

20. The cross connect of claim 19, further comprising a second optical power monitor measuring input power of each wavelength component of said input beams.

21. A method of interconnecting an input optical communications channel to a plurality of output optical communications channels comprising the steps of:

connecting said input optical communications channel to a selected one of said output optical communications channels through an optical switching network;

monitoring a power on said selected one output optical communications channel; and in response to said monitoring step, adjusting a transmission coefficient through said switching network of said one input optical communications channel to said selected one output optical communications channel, wherein said transmission coefficient is adjust to be less than its maximum adjustable value.

22. The method of claim 21, wherein said switching network is an all-optical switching network.

23. The method of claim 21, wherein said optical switching network includes a plurality of movable mirrors and wherein said transmission coefficient is adjusted by moving at least one of said movable mirrors.

24. The method of claim 23, wherein said connecting step includes moving at least one of said movable mirrors.

25. The method of claim 23, wherein said at least one of said movable mirrors is also used in said connecting step.

26. The method of claim 21 further comprising spectrally and spatially dispersing at least one multi-wavelength signal into said optical communications channels.

27. The method of claim 21 further comprising monitoring a power on at least one of said input communications channels.

28. A method for controlling an optical cross connect which includes a plurality of individually controllable transmissive elements comprising:

adjusting said transmissive elements to effect selective optical coupling between a plurality of input beams to a plurality of output beam monitoring optical powers on said plurality of output beams; and in response to said monitoring step, adjusting a transmission of said transmissive elements to achieve a predetermined relationship of optical powers between said plurality of output beams.

29. The method of claim 28, wherein said transmissive elements are rotatable mirrors and said adjusting includes rotating said mirrors.

30. The method of claim 28, additionally comprising monitoring optical powers on said plurality of input beams.

31. The method of claim 28, wherein said input and output beams are wavelength-separated components of a plurality of multi-wavelength input and output signals.

32. The method of claim 28, wherein said predetermined relationship is a predetermined ratio of said optical powers.

33. A method of interconnecting an input optical communications channel to a selected one of a plurality of optical output channels wherein said output communication channels have ports aligned along an axis and wherein at least one mirror is tiltable along a first direction to switch said optical input channel to any of said plurality of optical output channels and is tiltable along a second direction, wherein when said input optical channel is to be switched to a first one of said output channels to a second one of said output channels separated along said axis by a third output channel, said method comprises the sequential steps of:

tilting said mirror at least partially along said first direction to move an output beam away from said first optical input channel in a direction away from said axis;

tilting said mirror at least partially along said second direction; and tilting said mirror along at least partially along said first direction to move said output beam toward said second optical output beam in a direction towards said axis.

34. A cross connect system for selectively and optically interconnecting a plurality of optical input signals to selected ones of a plurality of optical output signals, comprising:

a controller;

an optical cross connect controlled by said controller, receiving said optical input signals from a plurality of input fibers, outputting said optical output signals to a plurality of output fibers, and capable of switching an optical input signal from any of said input fibers to a selected one of said output fibers;

input power taps connected to respective ones of said input fibers, each for tapping from said respective input fiber a fractional portion of an optical power carried therein;

output power taps connected to respective ones of said output fibers, each for tapping from said respective output fiber a fractional portion of an optical power carried therein; and an optical power monitor receiving outputs of said input and output power taps;

wherein said controller responsive to said optical power monitor adjusts an optical power transmission coefficient of at least one of said optical input signals through said optical cross connect.

35. The cross connect system of claim 34, wherein each of said input and output fibers carries a plurality of wavelength-separated optical signals within a wavelength band and wherein said input and output power tap said fractional portions without regard to wavelength.

36. The cross connect system of claim 34, wherein each of said input and output fibers carries a plurality of wavelength-separated optical signals within a wavelength band and said controller adjusts optical power transmission coefficients for selected ones of said wavelength-separated optical.

37. A optical switching system for connecting a plurality of input fibers to a plurality of output fibers, comprising:

an array of mirrors tiltable about respective first and second axes orthogonal to each, wherein tilting of said one of said mirrors about said first axis selects an optical connection between one of said input fibers and one of said fibers;

an array of optical detectors receiving light reflected from respective ones of mirrors; and a controller responsive to said optical detectors controlling said mirrors to tilt about said second axes to effect partial attenuation of light reflected by said mirrors from said input fibers to said output fibers.

* * * * *